United States Patent [19]
Poholek

[11] Patent Number: 5,319,368
[45] Date of Patent: Jun. 7, 1994

[54] GOLF CAR LIMITING SYSTEM

[76] Inventor: Ernest M. Poholek, 657B Hunts Bridge Rd., North Attleboro, Mass. 02760

[21] Appl. No.: 876,368

[22] Filed: Apr. 30, 1992

[51] Int. Cl.$^5$ .............................................. G08G 1/123
[52] U.S. Cl. .................................. 340/988; 273/32 R; 280/DIG. 5
[58] Field of Search ............... 340/436, 437, 439, 988, 340/933, 541, 901; 364/460, 424.01; 273/32 B, 32 H, 32 R; 280/DIG. 5; 180/271, 274, 277, 279; 318/587

[56] References Cited

U.S. PATENT DOCUMENTS

| | | | |
|---|---|---|---|
| 3,116,806 | 1/1964 | Rose | 200/61.44 |
| 3,443,658 | 5/1969 | Culp | 180/279 |
| 4,156,865 | 5/1979 | Lovell et al. | 340/436 |
| 4,460,889 | 7/1984 | Elks . | |
| 4,656,476 | 4/1987 | Tavtigian | 340/993 |
| 4,678,056 | 7/1987 | Kobari | 180/247 |
| 4,791,430 | 12/1988 | Mills | 343/837 |
| 4,926,161 | 5/1990 | Cupp | 340/572 |
| 4,970,509 | 11/1990 | Kissinger | 340/901 |
| 5,039,979 | 8/1991 | McClive | 340/438 |
| 5,044,634 | 9/1991 | Dudley | 340/988 |
| 5,053,768 | 10/1991 | Dix, Jr. | 340/988 |

OTHER PUBLICATIONS

Golf Course News Yarmouth, Me. 04096 p. 62, May 1991 Title–Three Strikes and You're Out at Heather Hills CC.

Primary Examiner—Brent Swarthout

[57] ABSTRACT

A limiting system having a sensor probe extending from the bottom, which makes contact to the traveled surface beneath a golf car, under which the device is mounted. The golf car control device has the capacity to differentiate between a golf car path, or if grass, audibly notifies as such. If path recognition by the golf car path control device is not differentiated when a first preset time interval expires, then operator of the golf car will be warned and after a second preset time interval the operation of the golf car may be terminated. The same limiting system has an internal capacity to recognize a preset impact force originating from an angle at a horizontal plane; responding more sensitively to that force from the front or rear of a vehicle versus from the side, and if the preset force is exceeded, thence terminating operation of the vehicle.

20 Claims, 5 Drawing Sheets

GOLF CAR LIMITING SYSTEM

BACKGROUND-FIELD OF INVENTION

This invention relates to preventing damage to golf cars and golf course grass, greens, tee, fairways, etc.

BACKGROUND

Description Of Prior Art

Plush green grass is preferable when playing golf. Golf cars traveling on the grass kill and mat the grass. Originally, an effective control to keep golf cars off the grass was not needed because there weren't as many golfers playing golf. . . . Presently there are many more golfers per golf course; this has caused a need for golf courses to prevent the damage done to the grass by golf car travel. Ruts quickly form on grass where the golf car travels, especially in wet areas. Any grassy area when repeatedly traveled by golf cars, will quickly become grassless and rocky.

One solution is to install a golf car path system, which the golfers must use, if driving a car, while playing golf. If golf car paths are installed a method is necessary to limit golf car travel to the golf car path. Most golf car paths installed at golf courses are asphalt.

The main unauthorized area of travel on a golf course with a golf car is on the grass or greens. Preventing grass damage is one purpose of this invention. Golfers may go and play at another golf course if the playing surface is not desirable. The second purpose of this invention is to prevent repeated damage to the golf car caused by excessive impact. The impact sensing system minimizes recurring negligence, such as playing bumper cars. The impact sensor can be used by itself (with associated circuitry) or in conjunction with the golf car grass and path sensing control unit for complete control of golf car operator usage.

Most present age inventions developed are becoming more costly, since simpler methods for obtaining the desired results have already been utilized. An example of this is depicted in the following: U.S. Pat. No. 4,656,476 to Tavtigian (1987) which discloses a complex and expensive method of restricting golf car travel in restricted areas. Utilizing the above patent to prevent unauthorized travel in a restricted area (considered in this case to be on the grass) can be very expensive. Limiting travel only on the car path using the above method is not very cost effective. Additional costs for each reflector or transmitter, maintenance, as well as repairs from vandalism is a deterrent for utilizing the method above. U.S. Pat. No. 4,926,161 to Cupp (1990) uses a similar transmitter-receiver triangulation method of localizing car position. But they both suffer from the same deterrents as stated above. Only roughly defined keep out areas can be enforced.

A method of using electronic information to process the status of a road (or golf car path) whether or not on the car path or grass may be possible. Analysis of U.S. Pat. No. 4,678,056 to Kobari et al. (1980), which utilizes an ultrasonic method for determining road surface condition is in order. Surface condition of the car path is not the present point, but is worth discussing. Many surface inconsistencies of a car path system can exist. Stated below are most of the problems and disadvantages encountered when using an ultrasonic method for recognition analysis between road (golf car path) and grass. There can be many kinds of surfaces composing a car path system. The most popular car path surfaces are asphalt, concrete, and macadam. These materials can be used simultaneously or exclusively for golf car path surfaces. Numerous surface inconsistencies can exist depending upon the type of material used to construct the car path. For example, if asphalt is used to construct the path, various irregularities can occur, including but not limited to: different batches, application temperatures, surface repairs, age, cracks, and plants emerging through the asphalt. Various surface irregularities stated above can comprise any golf course car path system. This can result in having five or more different surface consistencies. Varying surface conditions are a detriment for obtaining a successful surface analysis by any car path limiting system.

Another problem arising from using ultrasonic sensors under any vehicle, is the dirt or mud that builds up on the sensors. (A golf car limiting device has to be mounted directly in the path of the wheels, in order to accurately determine two wheels being driven on the grass). The result is an output data variance, if compared to output data taken on the same surface with no mud accumulation. The sensors would need cleaning often to improve dependability. Wind, especially varying temperature, blown across the sensors can affect the data used for discriminating surface types. Consider a golf car with ultrasonic sensors installed for a monitoring device. If the vehicle is standing still on a hot tar surface, the resultant output data of the sensors (there should be none) assimilates that of a moving vehicle on a surface.

Another disadvantage worth noting is high frequency scatter. As a transducer emits a high frequency signal towards a surface that has irregularities such as: stones, depressions, cracks, etc, the reflected high frequency wave(s) are scattered in multiple directions. Some transmitted high frequency waves contact the non-flat portion of that surface, and refract at many angles, inconsistent with that from a flat surface. Therefore, the received high frequency signal amplitude is irregular with varying path (road) consistencies.

A final problem with ultrasonic asphalt path surface analysis is an asphalt path with sound absorbing cavities just below the surface. These holes absorb some high frequency signals instead of reflecting, resulting in erroneos surface analysis.

Other complex golf car path identifying methods, using transducers above forty kilocycles may be possible. The main disadvantages are:

(a) Distance the transducer is mounted from the measured surface is sensitive: (when golfers sit on a golf car the height from the ground may change up to two inches; resulting in a change in output of data).

(b) The distance apart the send and receive transducers are is sensitive: (increasing size of housing).

(c) Sensitive to wind and temperature change: (changing output of data).

(d) Sensitive to surface irregularity: (smooth asphalt, rocky asphalt, old or new asphalt, concrete, leaves on the surface, cracks, frost heaves, etc.). This results in an inconsistent output of data, which decreases device recognition of the golf car path or grass.

Overall, this method results in increased circuit complexity, adjustments and cost.

Because no patents were found using the present invention procedure or discrimination technique for diagnosis between hard surfaces (asphalt, concrete etc.)

and grass, a prototype was constructed and evaluations are discussed.

The prototype high frequency transducers (above 160 kilocycles) measured surface sound absorbtion, surface flatness, and smoothness, the qualities that determed whether the surface was grass or a golf car path. The reflected signal level determined whether the surface was grass or a golf car path.

Below, are a number of disadvantages indicated when using an ultrasonic method for determining whether the golf car is traveling on either a hard path or grass surface:

(a) An additional ultrasonic antenna for transmit and receive were necessary to lessen amplitude variations detected by a receiver, transmitted by the transmitter, reflected off the irregular asphalt surface and detected by the receiver (U.S. Pat. No. 4,791,430 to Mills (1988) discloses an ultrasonic antenna that can be used to decrease the effects of irregular surfaces);

(b) Three transducers were necessary (began with one send and receive and changed to two send and one receive) to improve the height to ground operating range; (more costly)

(c) Transducer distance apart and height from the ground was critical; (in order to maintain a maximum efficiency, if the height to ground changed the optimum spacing between the transducers had to be changed)

(d) Due to the distance requirements between the transducers, a long housing size was necessary; (more costly, difficult to mount)

(e) Operational adjustments were lengthy; (more costly)

(f) There was limited room for mounting the longer housing underneath a golf car body; (insufficient mounting room in some cases)

Several types of road boundary identifying methods have been patented; however, grass recognition with road (path) recognition may not have been considered. Other possible configurations to obtain similar results will be addressed.

U.S. Pat. No. 4,970,509 to Kissinger (1990) describes identifying each side of the roadway by marking it with painted lines impregnated with a nuclear generating source, with a sensing detector system to identify the lines. The radioactive system uses a position identifying method determined by the proximity of the radioactive lines. Miles of paint, especially radioactively impregnated paint, is expensive and environmentalists may object to the extensive lines of radioactive paint.

If this prior art was to be used for simulating the effects of the present invention, it would be necessary to apply paint composed of radioactively impregnated particles on the car traveling surface. Either a minimum of two lines (spaced approximately four feet apart) or the entire car path and any area where the golf car would be driven, kept for rental, or storage would have to painted. If no radioactively impregnated paint covered the storage area when the golf cars were put away or stored for the night, the system would have to be deactivated. Too many variables exist for the above method to be a desirable and cost effective method of limiting golf car travel on a golf car path or car traveling area.

A roadway alarm system, U.S. Pat. No. 5,039,979 to McClive (1991) uses a similar detection method to determine proximity of the sensing units in relation to the metal-composed paint or activated metal wire under plastic tape. Painting the entire path and traveling area where the golf car travels is rather expensive. When multiple lines are used, the disadvantages are similar, as stated in the above paragraph. However if this system is used at a golf course for preventing golf car travel on grass, it could be easily bypassed by placing metal over the sensors.

U.S. Pat. No. 4,460,889 to Elks (1984) discloses a proximity alarm composed of a probe to sense a curb or low overpass. This probe is constructed to contact the curb surface and is not intended to intermittently contact the road surface as the vehicle travels. The probe in the present invention is intended to contact the road surface intermittently and has been designed to allow contact when reversing direction of travel, turning the vehicle, and to return contact with the road or grass surface after the probe tip is deflected at any angle up to one hundred and eighty degrees from the road surface or grass.

The present invention was chosen for its dependability, size, durability, ease of operation, owner variables, ease of adjustment and cost.

OBJECTS AND ADVANTAGES

It is an object of the present invention to provide a golf car limiting system which needs no supervision when used in a self resetting mode.

It is another object of the present invention to prevent grass damage done by golf cars from reoccuring.

It is another object of the present invention to warn a golf car driver when driving excessively on the grass.

It is another object of the present invention to disable the golf car when driven excessively on the grass.

It is a further object of the present invention to prevent damages done by impact force to golf cars from reoccuring.

Wherever an asphalt, cement, macadam or similar golf car path is installed, or where golf car abuse is apparent, this vehicle limiting system when installed in a golf car:

(a) will prevent unnecessary wear to the golf cars by limiting golf car travel to the path;

(b) will eliminate golf car users from driving golf cars on the grass;

(c) management will not have to pay hourly ranger personnel for the same purpose;

(d) hourly personnel cannot detect and enforce rules as quickly and efficiently as an electronic golf car control device installed on golf cars;

(e) the golf car limiting system, including the golf car speed control area, should be installed with a locking mechanism to secure that area which will prevent unnecessary tampering to the golf car or golf car control device;

(f) the invention is unrestricted by buried wire, painted lines or rail tracks to control travel of car; (g) the limiting system can be installed with little difficulty by most maintenance personnel;

(h) the golf car limiting system, in response to impact from a second golf car, will minimize disabling a first golf car while traveling if struck from the side, by the second golf car;

(i) the golf car limiting system, in response to impact from another golf car, will prevent disabling the golf car while stationary if struck from any direction, by another golf car;

Further objects and advantages are that the system can be adjusted for multiple applications, or can be used partially, without all the variables, depending on the needs of the golf course or business and will become apparent from a consideration of the drawings and ensuing description of it.

DRAWING—FIGURES

In the drawings, closely related figures have the same number but different alphabetic suffixes.

Description-FIGS. 1A, 1B, 2, 3, 4A, 4B, 4C

Figure 1A:
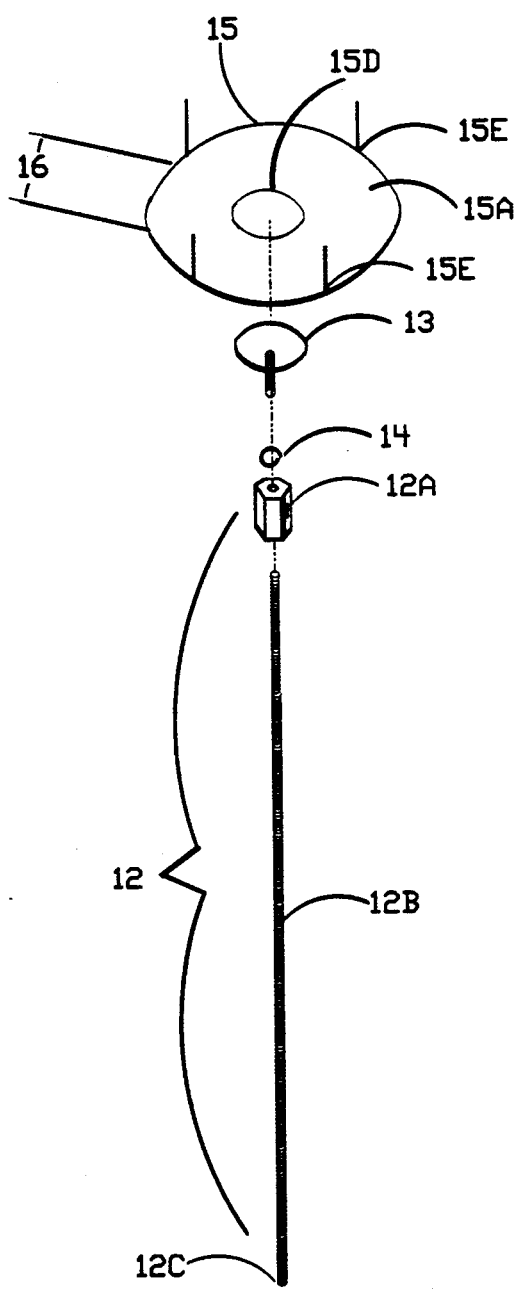
FIGS. 1A and 1B are two fragmentary sectional perspective views illustrating one of many possible mechanical methods to interconnect the scraping sensor onto the voltage transfer unit.
Figure 1B:
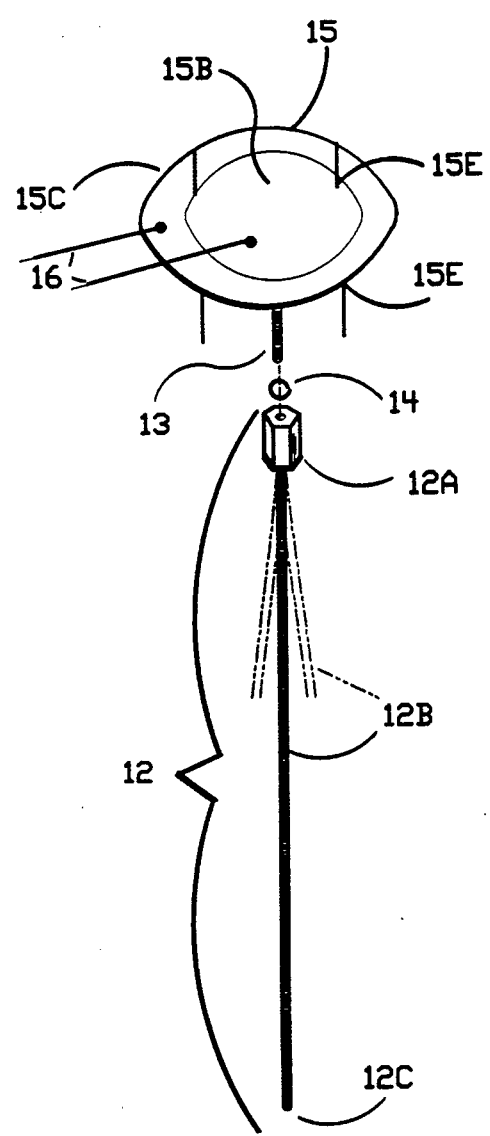

Sensor probe 12 is shown in detail in FIGS. 1A and 1B. An interconnection method of sensor probe body 12B to threaded brass or copper screw 13 is via threaded spacer 12A KEYSTONE Type 1657A. Sensor probe body 12B can be screwed into, crimped by, brazed into, welded into, glued into, soldered into, etc. threaded spacer 12A. Approximately one quarter to one half inch of sensing tip 12C which comes in contact with the golf car path should be hardened or covered with an abrasion resistant material such as boron, titanium, manganese, or similar hard facing material; for example, group 2A to 3C is High-Alloy Ferrous Materials with an alloy content of twelve to fifty percent. A low alloy metal could be used with two to twelve percent alloy content (or another material such as teflon) but may wear too quickly and require replacement. The length of sensor probe 12 can be between five to twelve inches. Flexible sensor probe body 12B is approximately one sixteenth of an inch in diameter, but is not limited to those dimensions. Sensor probe 12 should be covered with a sealant, shrink-tubing or other method to prevent corrosion of the flexible portion of sensor probe body 12B. Flexible sensor probe body 12B is constructed of inner strands of tempered steel, similar to a speedometer cable, but without the third exterior spiral wound layer.

Sensor probe body 12B should have the following characteristics and qualities:

(a) Superior return to original straight shape (if allowed to do so by releasing pressure against sensing tip 12C);

(b) It must not exert excessive downward pressure on the surface being sensed, which would wear sensing tip 12C rapidly to an unusable length; and (c) Good scraping to sound conversion, minimal resonant qualities, fast impulse damping (for example if sensor probe body 12B hits a rock with extreme force the vibration produced by that impulse deadens quickly). Please note that the sensor does not have to be constructed of metal; however, it is desirable to have the above mentioned characteristics.

Modified threaded copper or brass screw 13 (FIGS. 1A and 1B) and lock washer 14 is a method of interconnecting replaceable sensor probe 12 to piezoelectric vibration to voltage converter 15. Modified brass screw 13 is soldered 15D directly to the all metal side FIG. 1A of piezoelectric vibration to voltage converter 15. The piezoelectric material side FIG. 1B of piezoelectric vibration to voltage converter 15 has the attached piezoelectric crystal disk 15B and output wires 16 are soldered as indicated (one lead is soldered to the outer metal edge of piezoelectric vibration to voltage converter 15 and the other lead is soldered to the attached plated piezoelectric crystal disk 15B). Mounting tabs 15E are soldered or tack welded to the piezoelectric material side FIG. 1B of piezoelectric vibration to voltage converter 15. Piezoelectric vibration to voltage converter 15, can be constructed of any type of audio range microphone or vibration sensor.

Figure 2:
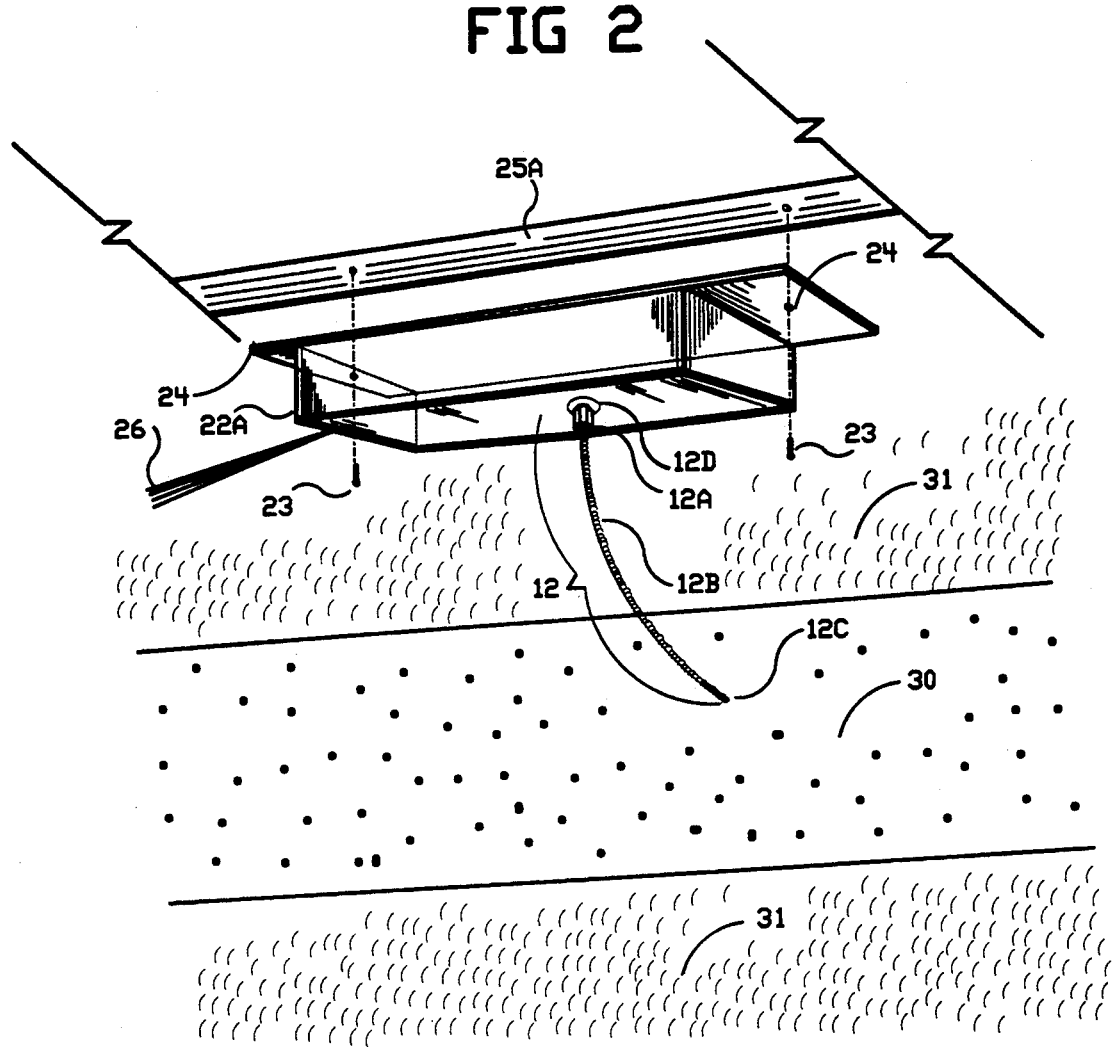
FIG. 2 is a fragmentary sectional perspective view of the scraping sensor and control unit for mounting under a golf car, indicating approximate angle of the scraping sensor on the path or grass surface.
Figure 6:
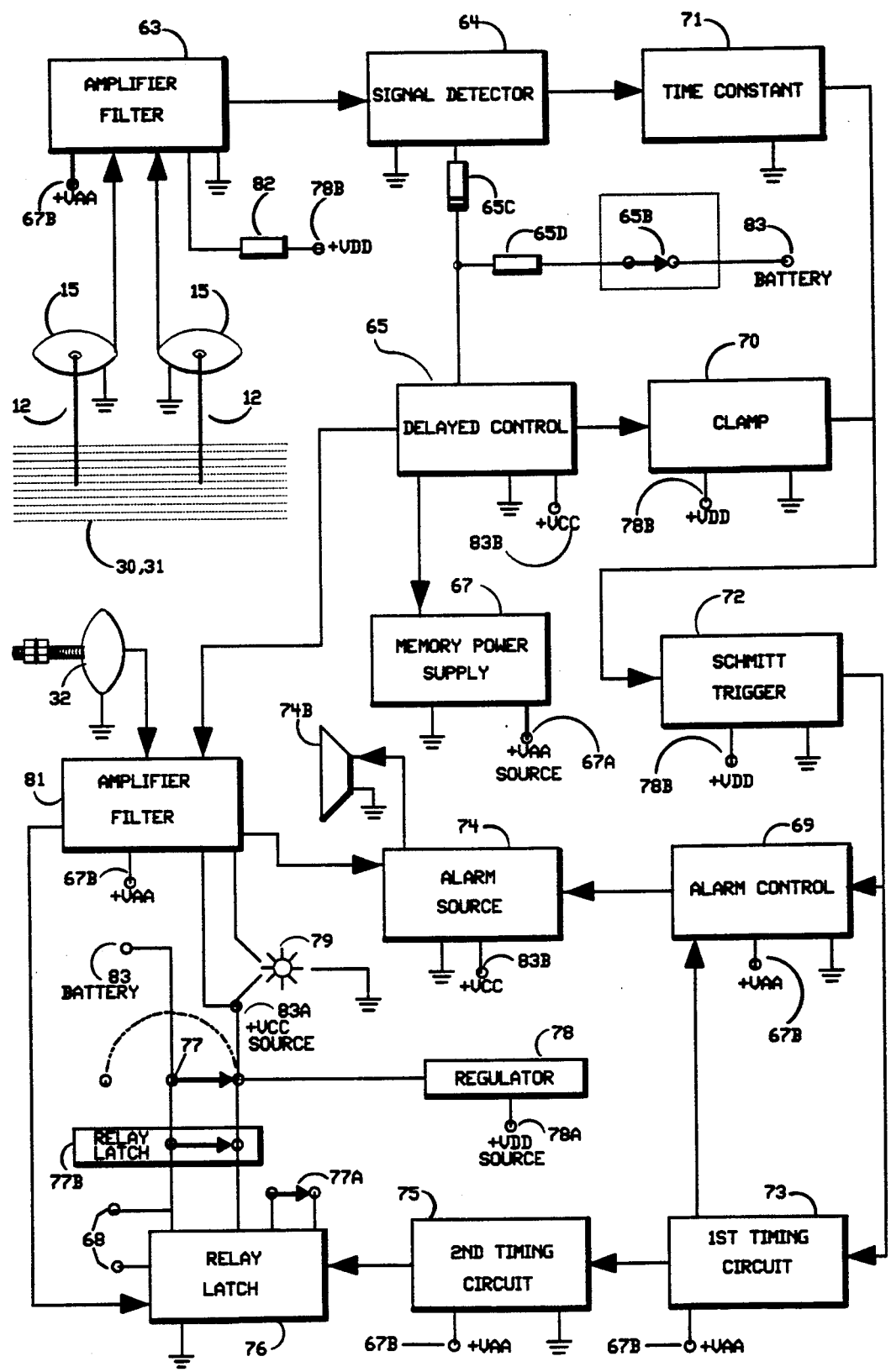
FIG. 6 is a functional block diagram of the golf car limiting system.

A typical embodiment of housing 22A and sensing probe 12 of the present invention is illustrated in FIG. 2. Sensor probe body 12B is flexible and has complete return to straight shape quality (when no pressure is exerted onto sensor probe surface 30, 31 contact end 12C) with no retention shape of a previous angle of deflection 12B (FIG. 1B); a quality necessary because a golf car travels in either forward or reveres direction. Housing 22A is approximately 1"H×4"W×2¼"D, but any housing can be used. Wiring harness 26 connects to a speaker or a buzzer, the movement control section of the golf car, and the golf car battery 83 (FIG. 6). Housing 22A (FIG. 2) is mounted by placing mounting screw 23 into each mounting tab 24 securing onto a suitable mounting area 25A under the golf car body.

Figure 3:
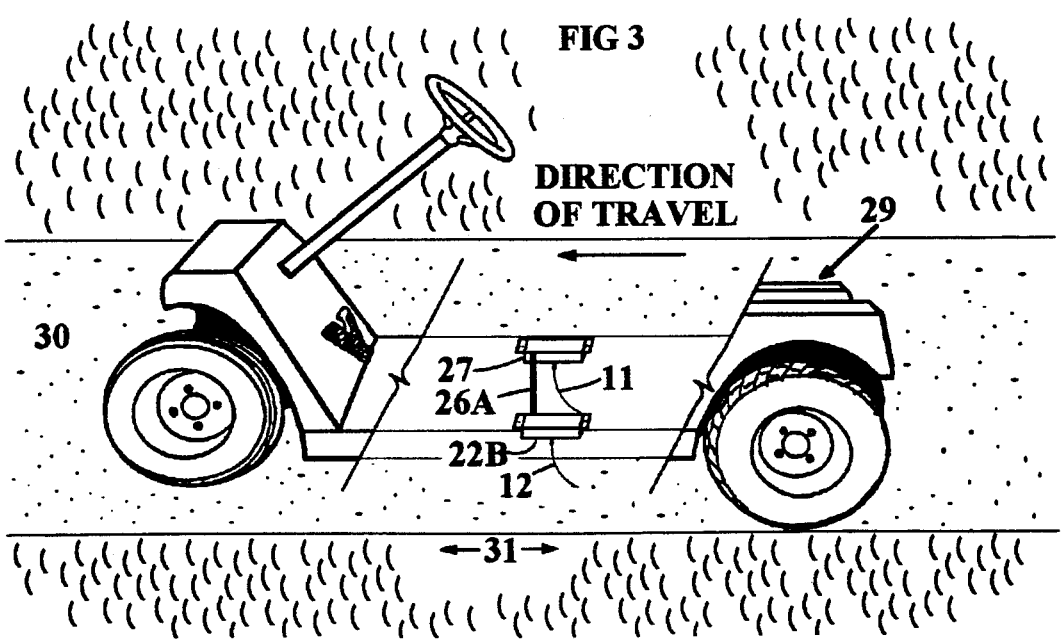
FIG. 3 is a fragmentary perspective view of a golf car indicating a mounting position for the control unit and a slave unit, which are both necessary for identifying a traveling golf car with two wheels on the golf car path and two wheels on the grass.

FIG. 3 depicts golf car 29 traveling forward on car path surface 30 with grass surfaces 31 on each side of the car path. An interconnection wiring harness 26A is used to connect slave unit 27 to control unit 22B. Sensor probe 12 and control unit 22B are interconnected by wiring harness 26A to slave unit 27 comprised of an internal amplifier and external sensor probe 12.

Impact sensor 32 (FIGS. 4A, 4B, 4C) is similar in construction to piezoelectric vibration to voltage converter 15 (FIGS. 1A and 1B). Two nuts 33 and lockwasher 34 are screwed onto modified brass or copper screw 35 which is soldered or tack welded 36 onto the edge on the flat all metal side (FIG. 4A) of impact sensor 32 (soldered at a three o'clock or nine o'clock position). The two side impact force adjustment nuts 33 and lock washer 34 serve as weights, and as adjusted cause piezoelectric disk 15B to flex with a different sensitivity ratio at different angles when a sudden movement is introduced. Mounting tabs 37 can be soldered directly to a printed circuit board. The piezoelectric material side of impact sensor 32 (FIG. 4B) indicates output wires 39 soldered (one lead is soldered to the outer metal edge of impact sensor 32 and the other lead is soldered to the plated piezoelectric or crystal disk 32A). When an impact sensor 32 (FIG. 4C) is mounted within golf car 29, the maximum voltage output level responds to an impact force with maximum sensitivity from the directions shown 38A, indicating an impact force in relation to a forward or reverse travel direction. The same impact force in any other direction (from the side) results in less output voltage level.

OPERATION-FIGS. 3,4C,5,6

Figure 5:
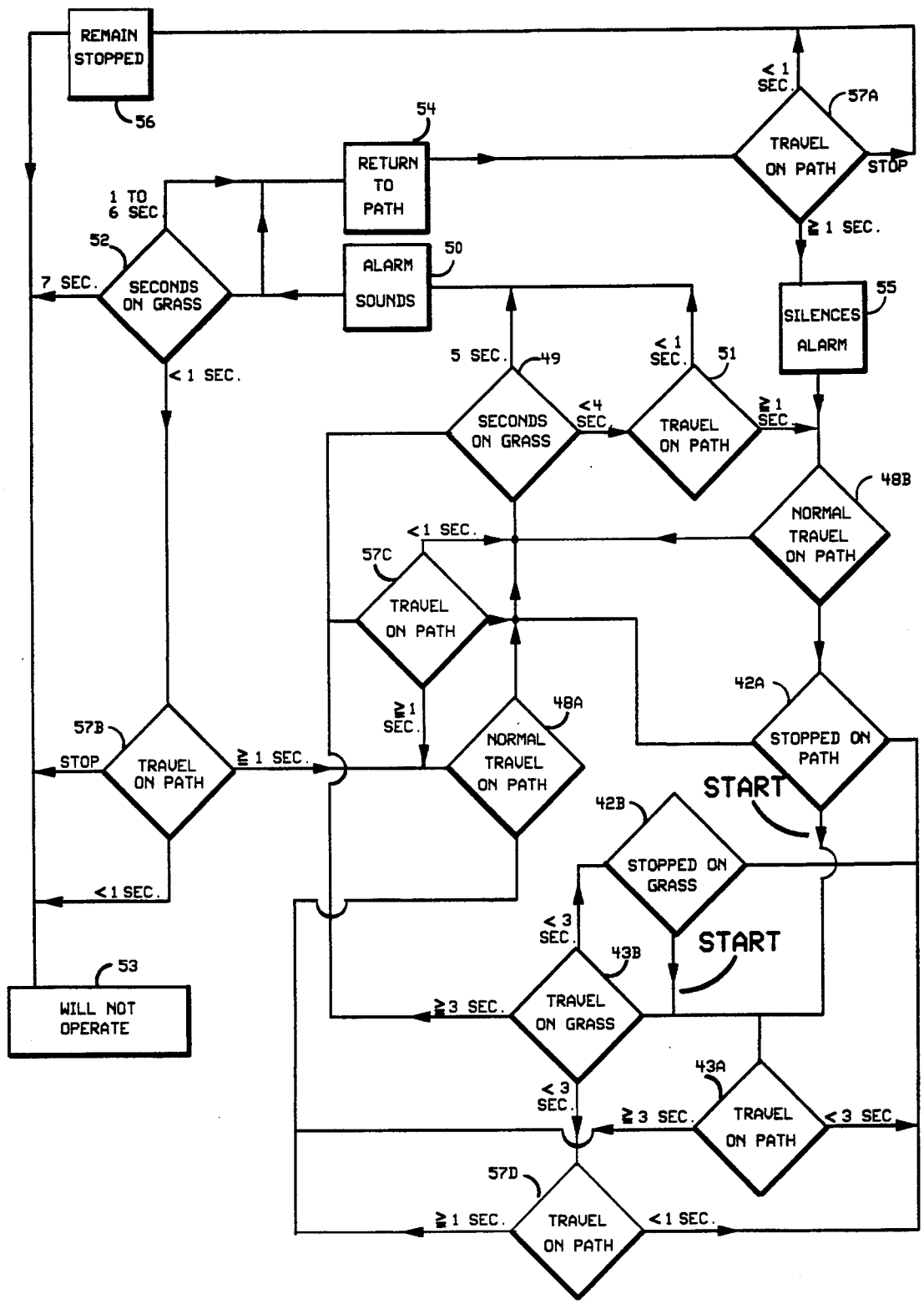
FIG. 5 is a flow chart showing the golf car grass sensing limiting system logic of operation, with reference to vehicle usage.

After a golf car has been stationary for more than two minutes the starting point is 42A or 42B and all diagram functions are per FIG. 5. If a golf car has been stationary for one second the starting point is also 42A or 42B, however, if the first predetermined seconds on grass time period 49 (first timing circuit 73 FIG. 6) or the second predetermined seconds on grass time period 52 FIG. 5 (second timing circuit 75 FIG. 6) has an accrued time period, each predetermined time period will adjust accordingly as will be explained in the block diagram FIG. 6 description. Refer to FIG. 5 and FIG. 6.

Time constant 71 FIG. 6 is responsive to golf car travel on path 43A (third electrical signal), travel on grass 43B (FIG. 5) (second electrical signal) or stationary (first electrical signal); time constant 71 is responsive to travel on path 57A, 57B, 57C, 57D C (FIG. 5; will not operate 53 (FIG. 5) is equivalent to being deactivated by first relay latch 76 (FIG. 6).

The invention sequence of typical car operation (refer to FIG. 5) for narrow car paths is explained as follows:

For the first example, the golf car driver begins car travel on the path from a complete stop and continues traveling on the path until the destination is reached.

The golf car driver begins car travel from a complete stop on path 42A START; continues car travel on the path more than three seconds 43A; thence travels on the path for an additional three seconds 57D; thence continues car travel on path 48A; until the destination is reached, and after stopping completely on path 42A returns to START, recycling the entire operation.

For a second example, the golf car driver starts travel on the car path and immediately drives onto the grass and either stops or continues driving on the grass. When the on grass warning sounds, the driver then returns to the path.

The golf car driver begins car travel from a complete stop on path 42A; thence travels on the grass for three seconds 43B; continues traveling five more seconds on grass 49 (whether stopped or traveling); warning or alarm signal sounds 50; thence the golf car driver returns to car path 54 and travels on the path for more than one second 57A silencing alarm 55; from that point travels on path 48B until the destination is reached.

For a third example, the golf car driver starts travel on the car path and after traveling on the path for ten seconds immediately travels on the grass and stays on the grass until the invention deactivates the golf car. Once the golf car has been deactivated it must be reset, then the operator will be allowed to drive back to the car path. The violator then can be penalized or warned by management. If continued violation occurs by the same car users, they can be banned from using golf cars on the golf course. To avoid necessitating management sending out someone to restart the golf car, an option may be added to automatically resart the golf car when a preset time interval is exceeded, for example, fifteen minutes.

The golf car driver begins car travel from a complete stop on path 42A; continues car travel on the path more than three seconds 43A; continues travel on the path for an additional six seconds 48A; travels on the grass for five seconds 49; immediately the warning or alarm signal sounds 50; thence the golf car driver continues travel (or stops) on the grass for seven seconds 52, the golf car is deactivated and must be reset by switch 53, the alarm signal will remain sounding for one more minute; once the golf car is reset the golf car driver will be completely stopped on grass 42B (depending on how far the golf car was from the car path will determine what sequence the flow chart will depict as the golf car driver attempts to return to the car path); after the golf car is reset the golf car is stopped on the grass 42B; thence travels on the grass for three seconds 43B; continues travel five more seconds on grass 49; the warning or alarm signal sounds 50; thence the golf car driver continues traveling on the grass for up to six seconds 52, (if the golf car has not reached the car path and traveled one second, the golf car will have to be reset again) and returns to car path 54 and travels one second on car path 57A; silencing alarm 55, continuing normal car travel on path 48B until the destination is reached.

Figure 4A:
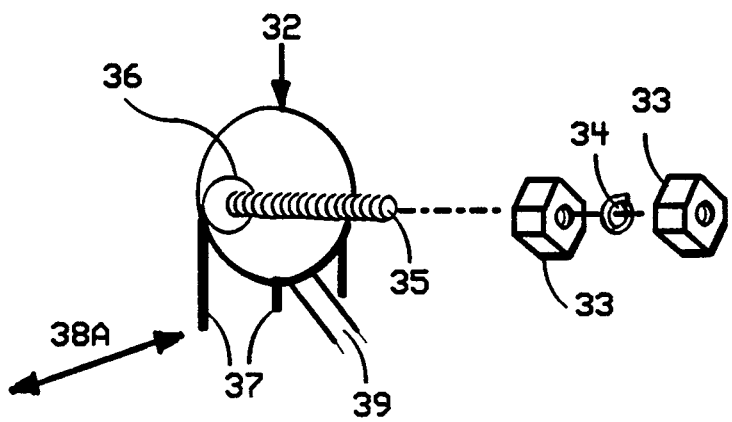
FIGS. 4A and 4B are fragmentary sectional perspective views of a piezoelectric sensing disk, and adjustable weights.
Figure 4B:
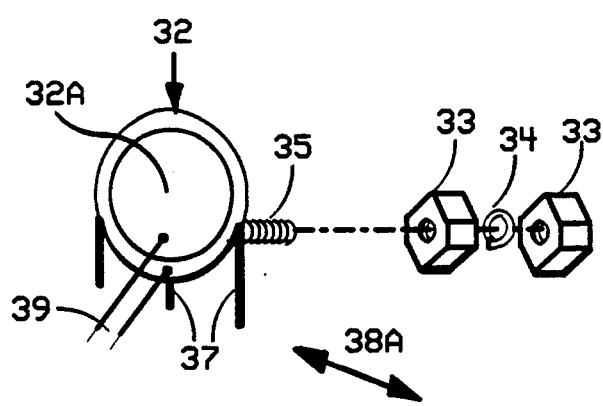
Figure 4C:
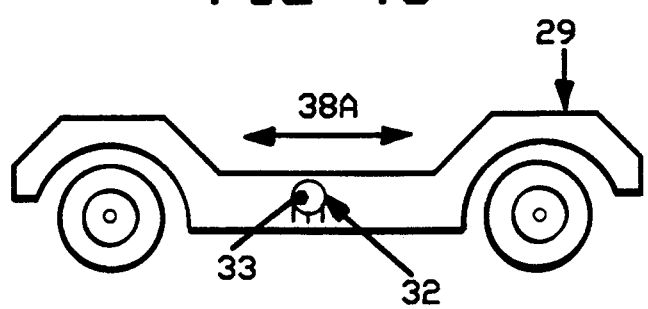
FIG. 4C is a fragmentary sectional elevational view of a piezoelectric sensing disk, adjustable weights and mounting position of the piezoelectric sensing disk in a golf car.

FIG. 4C shows an impact sensor 32 mounted within golf car 29. When a golf car is driven into another golf car or other object, a measurement of acceleration is produced. When a predetermined set measurement unit of acceleration is exceeded, the golf car is disabled. The predetermined measurement unit of acceleration cutout level within second amplifier filter 81 FIG. 6 is adjustable. The frequency response curve of the second amplifier filter is selected to pass frequency signals generated from an impact to the golf car. The golf car cutout operational sequence is as follows. A golf car is being driven, which turns +VAA SOURCE 67A on, the signal sequence is: 32, 81, 76. When the golf car being driven crashes into an object with sufficient force to exceed the preset measurement unit of acceleration, alarm 74B sounds, impact sensor 32 (FIG. 4C) senses the occurrence, amplified by second amplifier filter 81 (FIG. 6), produces a trigger output which latches first relay coil and first relay 76 contacts 68 to a first contact position which disables the golf car and monitor indicator 79 illuminates red. Both first relay latch 76 and monitor indicator 79 are supplied voltage by +VCC SOURCE 83A. Golf course management must reset first relay latch 76 for the golf car to operate by placing switch 77 into the open second switch position then placing switch 77 back to the closed first switch position. The closed switch position applies power to a first latching relay coil and to the limiting system which allows impact or grass path sensing (depending upon the options chosen). The open switch position silences alarm 74B, removes power from the limiting system and removes power from the first latching relay coil which closes first relay latch 76 second contact position 68. Switch 77 is used identically for resetting, powering or bypassing the impact monitoring system or the grass path sensing system. When first relay latch 76 is reset, monitor indicator 79 is no longer illuminated.

FIG. 6 shows a block diagram comprising sensor probe 12 and piezoelectric vibration to voltage converter 15, or auxilary sensor probe 12 and auxilary piezoelectric vibration to voltage converter 15 (used with a slave unit (FIG. 3) 27). Sensor probes 12 come in contact with the surface the golf car travels on 30,31 (grass or path). The resultant output obtained from sensor probe 12 (and auxiliary sensor probe 12 if used), is received by first amplifier and high pass filter 63 for producing selected frequency signals. The high pass filter used has a slope of twelve to forty decibels per octave with an upper corner frequency of approximately five hundred cycles per second depending on the probe used. The path developed signal frequencies gathered by the sensor probe are mostly above two hundred cycles per second and the grass developed frequencies are mostly below two hundred cycles per second. This information is passed through to signal detector 64, which processes information to a voltage level predetermined for sensing either path 30 (third electrical signal), grass 31 (second electrical signal) or if stationary (first electrical signal).

Gas pedal switch 65B (FIG. 6) of a golf car can be used to start (producing a second or third electrical signal) and stop (producing a first electrical signal) the limiting system functions as an added safety precaution in case sensor probe 12 does not contact the surface. Battery 83 supplies the voltage to gas pedal switch 65B, connected to resistor 65D which limits the current supplied, connected to polarity isolation diode 65C and to delayed control 65.

When a golf car begins traveling it must travel for three seconds to activate a sensing mode controlled by delayed activation control circuit 65; if traveling three more seconds on the grass before the golf car is stationary, the golf car could either be stopped on the grass or moving and still be detected as being on the grass. Delayed activation control 65 responds to a second or third electrical signal, producing a delayed third electrical signal which delays activating (for three seconds) clamp 70 and amplifier filter 81 and is a power startup delay for memory power supply 67 which supplies +VAA SOURCE 67A. Delayed deactivation control 65 responds to a first electrical signal, producing a delayed fourth electrical signal which delays deactivating (for one second) clamp 70 and amplifier filter 81, and delays triggering a third predetermined time period. When the third predetermined time period has ended, +VAA SOURCE 67A is deactivated. After memory power supply 67 has been activated by delayed control 65, memory power supply 67 maintains its power +VAA SOURCE 67A for a predetermined time period (normally set for two minutes). Therefore, +VAA SOURCE 67A supplies voltage for a period of time to numerous circuits three seconds after golf car 29 (FIG. 3) starts traveling, and maintains the voltage (for two minutes and one second) after the golf car is stationary. At the end of the third predetermined time period +VAA SOURCE 67A from memory power supply 67 resets or cancels the first predetermined time period within first timing circuit 73 and the second predetermined time period within second timing circuit 75.

Clamp 70 allows schmitt trigger 72 input voltage level or time constant output level 71 to go below two volts (delayed first electrical signal) or to rise above eight volts (delayed second electrical signal); however, will not allow the input voltage level to drop below this eight volt level one second after the golf car is stationary on either the grass or the path (delayed fourth electrical signal). Clamp 70 output level of approximately eight volts occurs one second after the golf car is stationary. Three seconds after the golf car begins traveling the delayed third electrical signal causes clamp 70 to release from the delayed first electrical signal or the delayed second electrical signal allowing passage to the input of schmitt trigger 72. Clamp 70 and schmitt trigger 72, require a continual regulated power supply +VDD 78B to allow a memory function within schmitt trigger 72.

Time constant 71 FIG. 6 is a delayed signal processor, passing a delayed direct current voltage (delayed first electrical or second electrical signal) directly proportional to its input level after a predetermined discharge time constant (delayed first electrical signal) or charge time constant (delayed second electrical signal) has expired. Charge time constant control circuit 71 determines how quickly its output voltage level rises when a golf car is driven from the grass onto the golf car path. Discharge time constant control circuit 71 determines how quickly its output voltage level drops when a golf car is driven from the path onto the grass. Time constant 71 output voltage range is anywhere between zero to above ten volts direct current connected to the input of schmitt trigger Whenever the golf car is being driven on the grass, sensor probe 12 may come in contact with hard objects. Charge time constant control circuit 71 is included to prevent hard objects from creating false readings and resetting schmitt trigger 72 from a logical ONE output. An input condition is included in control circuit 71 which demands the interval of hard objects has to be greater than one second of traveling with the golf car over continual hard objects (this adjustment can be changed to a different interval other than one second, typically one to four seconds). The normal setting of charge time constant control circuit 71 is one second and the setting depends upon the occurance of rocks or bare areas detected between the grass. The normal setting of discharge time constant 71 is three seconds, and the setting depends upon the quantity of leaves, sand or grass on the car path.

When the golf car has traveled more than three seconds on the grass and is stationary, or is traveling more than three seconds on the grass, a voltage below two volts to schmitt trigger 72 (delayed first electrical signal) input causes a logical ONE output from schmitt trigger 72 (fourth electrical signal). After the golf car has stopped, then travels more than three seconds on the path a voltage above ten volts to schmitt trigger 72 (delayed second electrical signal) input causes a logical ZERO output from schmitt trigger 72 (fifth electrical signal). Schmitt trigger 72 input level of between two and ten volts is a transitional area where no change of schmitt trigger 72 output occurs. Schmitt trigger 72 therefore retains a memory of the last traveled surface, path or grass.

Time constant 71 output between two and ten volts is rarely indicative of a golf car traveling on a car path or grass, it is a safety voltage area designed to eliminate false alarms, and when used with schmitt trigger 72 detects the golf car traveling from the car path onto the grass (traveling on the grass for a few seconds) then stopping on the grass.

Schmitt trigger 72 output connects a logical output of ZERO or ONE to first timing circuit 73 input and to alarm control circuit 69 input.

Clamp 70, discharge time constant 71 and schmitt trigger 72, inhibit additional safety margins for proper surface 30,31 diagnosis, assist in automatic device operation, and permit detection of a golf car stopped on the grass adjacent to the car path after the golf car has traveled at least three seconds on the grass (regardless of first timing circuit 73 interval setting).

When a logical ONE occurs, first timing circuit 73 counts forward a first predetermined time period. When a logical ZERO occurs (fifth electrical signal), first timing circuit 73 counts backward the first accumulated predetermined time period at a different count rate, for example, one second backward count for every five second interval a logical ZERO occurs, until the accumulated first predetermined time period is subtracted to zero, resetting the first predetermined time period. If a logical ONE occurs for the complete first predetermined time period, alarm 74B sounds. If the second predetermined time period has not expired and a logical ZERO occurs, alarm 74B silences.

Returning the golf car to the car path and traveling for one second on the car path (a logical ZERO occurs) before the seven second (adjustable) first predetermined time period of first timing circuit 73 expires, silences on grass warning (alarm device) 74B and the invention continues grass and path monitoring.

When a logical ZERO occurs on the output of schmitt trigger 72, the first reason for counting the accumulated time period (within first timing circuit 73) backward at a different rate is for resetting first timing circuit 73 and for detecting the golf car driven from the car path, onto the grass, then immediately back onto the car path, continuing this cycle repeatedly; in this case the first accumulated time period will continue counting from the same accumulated first time period (minus the slower backward count rate). The second reason for counting the accumulated time period backward is to allow sequential passing of golf cars that are blocking passage of golf car travel on narrow golf car paths.

Alarm control 69 is a logic circuit that responds to the output conditions of schmitt trigger 72, and first timing circuit 73. Alarm control 69 output switches alarm source 74 output on or off which supplies a driver signal or voltage to alarm speaker/siren 74B. Alarm source switches on when both a logical ONE of schmitt trigger 72 output occurs and when the first predetermined time period has expired. Alarm source 74 switches off whenever a logical ZERO of schmitt trigger 72 output occurs (as long as the golf car has not been deactivated by first relay latch 76), or when delayed deactivation control 65 removes control from memory power supply 67 allowing the third predetermined time period to commence. When the third predetermined time period has expired, alarm control +VAA 67B is deactivated and alarm source 74 is deactivated.

When the first predetermined time period has expired, second timing circuit 75 counts a second predetermined time period (adjustable). Second timing circuit 75 stores the accumulated second predetermined time period until reset +VAA 67B by memory power supply 67 +VAA SOURCE 67A (third predetermined time period). At the end of the second predetermined time period second timing circuit 75 powers first relay latch 76 deactivating the golf car.

Switch 77 is used to reset a deactivated golf car which silences the alarm and returns operation to the golf car controlled by the limiting system.

If a golfer drives the golf car on the grass and does not exceed the second predetermined time period of second timing circuit 75 and the golf car travels for one second on the path-all within a two minute time period, the buzzer stops sounding via 12, 15, 63, 64, 69, 71, 72, 73 and 74.

Two variations of the deactivation sequence of a golf car by first relay latch 76 control could be:

a. First relay latch 76 can self reset by opening contact switch 77A. The reset would then be automatically controlled by memory power supply 67 from +VAA SOURCE 67A.

b. First relay latch 76 can be disconnected from the golf car run circuit 68. In that case, alarm 74 is shut off when the third predetermined time period within memory power supply 67 has expired. The first and second predetermined time period are reset as previously stated.

Switch 77 is installed on the golf car, in a convenient area, which allows the management to either conveniently bypass this invention or use it. Switch 77 can be any switch with an open and a closed contact position, preferrably a key controlled switch, a touch pad security code switch, or a uniquely coded low power remote control transmitter and receiver combination which can be used to replace switch 77. Each transmission of uniquely coded signal is transmitted from a hand held transmitter, and received by receiver and control circuit which replaces switch 77 with second latching relay 77B that latches and maintains contact to one of two positions when a transmission of a uniquely coded signal is received. When a second transmission of a uniquely coded signal is received, the second latching relay 77B latches and maintains the alternate contact position. Standby power +VDD 78B is fed through resistor 82 (further minimizing current draw from the golf car battery 83), which is a standby power source for first amplifier filter 63. First amplifier filter 63 is supplied voltage +VAA 67B from Memory power supply 67 +VAA SOURCE 67A. Total standby power draw when the golf car limiting system is not being used is approximately ten milliamps. Most golf car batteries have an internal discharge current well exceeding ten milliamps.

Speaker 74B or alarm device can be mounted anywhere in a convenient area within the car body, secured by a mechanical or electronic anti-tampering lock.

An indicator 79 can be used to signify whether this invention is in use. For example: The golf car is being monitored by the limiting system when grass monitoring indicator 79 illuminates green. When a golf car is disabled by driving on the grass violation indicator 79 blinks green. If a golf car is disabled by impact, the limiting system indicator 79 illuminates red. All lights off indicate grass monitoring is disabled. For ease of mounting, bi-color light emitting diode 79 can be mounted in a single hole.

Where wide golf car paths are used a two second grass response time can be achieved (the time it takes the invention to warn the people in the golf car they are on the grass). To detect two wheels of the golf car traveling on the grass, two sensor probes 12(FIG. 3) must be used, one mounted on control unit 22B between the two left wheels of the golf car, and one on slave unit 27 mounted between the two right wheels of the golf car (or control unit 22B mounted between the two right wheels of the golf car and slave unit 27 mounted between the two left wheels of the golf car). Both control unit 22B and slave unit 27 work in conjunction with each other and their attached sensor probes 12 to sense the golf car traveling surface 30, 31 under the golf car.

Upon initial startup the invention overall grass sensing time is the longest response time of either delayed activation control circuit 6B (FIG. 6) or discharge time constant control circuit 71. If the golf car is already moving on the path, and the golf car travels onto the grass, the grass sense response time or discharge time constant control circuit 71 is as low as two seconds.

SUMMARY, RAMIFICATIONS, AND SCOPE

When the present invention is installed in a golf car the management has a choice either to use the golf car limiting system in an active mode, which allows use of the limiting system controlling the operational function of the golf car, or in a bypassed mode which allows bypassing the limiting system, permitting normal operation of the golf car unsupervised by the limiting system. Both modes are controlled by a single switching method placed into one of two positions. If the golf car is deactivated by the limiting system, it can then be reset by the same switch to operate the golf car in the active or the bypassed mode.

Accordingly, the reader will see that this invention has many advantages. There are many adjustment variables and procedures that make this invention unique. There can be no false alarms when golf courses serve the public which are paying for a service; that is, renting a golf car to play the game of golf. The golf car user that follows the golfing and establishment rules should obtain a troublefree game of golf. However the violator of those rules must be penalized. The end result of using this invention is a more efficiently run establishment, improves the clientel, improves the condition of the grass, prevents reoccuring damage to golf cars and minimizes accidents.

Although the description above contains many specificitiee, these should not be construed as limiting the scope of the invention but merely providing illustrations of some of the presently preferred embodiments of this invention. This invention is intended to include such alternatives, changes and modifications as may become apparent to those skilled in the art. For example golf car is possible, in which deactivation when excessive impact occurs to the golf car, the alarm will not sound and the golf car will not operate. When this invention is used for grass sensing, a warning may be adequate instead of complete deactivation of the golf car. Sensor 12 (FIG. 1A) can have other shapes, such as oval, flat, etc.; piezoelectric vibration to voltage converters 15, can be a microphone, stylus, accelerometer, etc.; regardless of how many times in the above text the vehicle control device has been depicted as used for grass or impact sensing simultaneously in conjunction with a golf car, it is not limited to such.

Thus the scope of the invention should be determined by the appended claims and their legal equivalents, rather than by the examples given.

What is claimed is:

1. A limiting system warning when a golf car is improperly driven comprising:
    a housing;
    sensor probe means, located on said housing, mounted under said golf car for producing contact signals dependent upon the frequency and vertical impact of a contact point along the horizontal movement therealong;
    first amplifier filter means, located in said housing, for producing selected electrical frequency signals in response to said contact signals for reducing improper signal pickup from said sensor probe;
    signal detecting means, located in said housing, responsive to said selected electrical frequency signals producing a first electrical signal when said golf car is stationary, producing a second electrical signal when said golf car is traveling on the grass, and a third electrical signal when said golf car is traveling on the car path;
    time constant means, located in said housing, for producing a delayed first electrical signal and a delayed second electrical signal, producing said delayed first electrical signal responsive to said first and said second electrical signal, producing said delayed second electrical signal responsive to said third electrical signal; delayed control means, located in said housing, for producing a delayed third electrical signal responsive to either said second or said third electrical signal indicating when said golf car beings traveling, said delayed control means being further adapted for indicating when said golf car is stationary by producing a delayed fourth electrical signal responsive to said first electrical signal;
    memory means, located in said housing, for producing a fourth and fifth electrical signal responsive to said delayed first and said delayed second electrical signal respectively for memory of the last surface said golf car has traveled on;
    clamp means, clamping said delayed first and said delayed second electrical signals to a level which does not allow said memory means to respond to a level change until said delayed control means produces said delayed third electrical signal;
    timing means, located in said housing, for counting a first predetermined time period and a second predetermined time period after counting said first predetermined time period, said <the> timing means further being adapted for counting a third predetermined time period after said second predetermined time period has expired;
    alarm means for sounding an alarm when said fourth electrical signal occurs and said first predetermined time period is counted by said timing means, said alarm means being further adapted for a silencing of said alarm when said fifth <sixth> electrical signal occurs;
    deactivating means for ending operation of said golf car after said second predetermined time period is counted by said timing means;
    switching means for manually resetting said deactivating means and silencing said alarm, allowing use of said golf car with assistance of said limiting system, said switching means also for manually bypassing said limiting system allowing use of said golf car without assistance of said limiting system.

2. The limiting system according to claim 1, wherein said delayed control means is responsive to a first auxiliary trigger produced by depressing a gas pedal <switch> on said golf car producing said second or said third electrical signal, indicating that said golf car is traveling, said delayed control means is further responsive to a second auxiliary trigger produced by releasing said gas pedal on said golf car producing said first electrical signal, indicating that said golf car is stationary.

3. The limiting system according to claim 1, wherein said switching means is a switch moveable between a first switch position and a second switch position, said first switch position triggering a latching relay control circuit which moves a latching relay to a first contact position, said second switch position triggering said latching relay control circuit which moves said latching relay to a second contact position.

4. The limiting system according to claim 3, wherein said switching means includes transmitting a uniquely coded signal from a hand held transmitter, within close proximity receiving said uniquely coded signal in a receiver, triggering said latching relay control circuit, which latches said latching relay and maintains contact between said first contact position, retransmitting said uniquely coded signal which latches said latching relay and maintains contact between said second contact position, each transmission of said uniquely coded signal latches said latching relay which maintains contact between said first contact or said second contact position.

5. The limiting system according to claim 3, wherein said switching means includes a digital touch pad responding to a numbered sequence to replace said switching means.

6. The limiting system according to claim 1, wherein said deactivating means is responsive to a <second> amplifier filter control means triggering a latching relay control circuit which moves a latching relay contact to a first contact position.

7. The limiting system acording to claim 3, wherein said switching means includes reactivating means by switching momentarily said switch to said second switch position then switching back to said first switch position.

8. The limiting system according to claim 1, wherein said alarm means sounds an audible signal alerting that the golf car driver has been driving said golf car on the grass for an excessive time period.

9. The limiting system according to claim 1, wherein said timing means includes setting means for adjustably setting said first and second predetermined time periods.

10. The limiting system according to claim 1, further comprising sounding said alarm for a limited time, and silencing said alarm after said third predetermined time period has expired since said deactivating means has ended operation of said golf car.

11. The limiting system according to claim 1, wherein said timing means includes a means of subtracting accumulated time from said first predetermined time period when said fifth electrical signal is occurring, and if said first predetermined time period is zero, said timing means begins counting said first predetermined time period when actuated.

12. The limiting system according to claim 1, further comprising indicting means for visual indication of the golf car operational status, said indicating means is responsive to said deactivating means and said switching means wherein the indicator is a light emitting diode.

13. The limiting system according to claim 1, further comprising disconnecting power means when said third predetermined time period has ended, for disconnecting a power source from said limiting system, and resetting said first and second predetermined time periods to begin counting said first and second predetermined time periods when actuated.

14. A limiting system warning when a golf car is improperly driven comprising:
a housing;
sensor probe means, located on said housing, mounted under said golf car for producing contact signals dependent upon the frequency and vertical impact of a contact point along the horizontal movement therealong;
first amplifier filter means, located in said housing, for producing selected electrical frequency signals in response to said contact signals for reducing improper signal pickup from said sensor probe;
signal detecting means, located in said housing, responsive to said selected electrical frequency signals producing a first electrical signal when said golf car is stationary, producing a second electrical signal when said golf car is traveling on the grass, and a third electrical signal when said golf car is traveling on the car path;
time constant means, located in said housing, for producing a delayed first electrical signal and a delayed second electrical signal, producing said delayed first electrical signal responsive to said first and said second electrical signal, producing said delayed second electrical signal responsive to said third electrical signal;
delayed control means, located in said housing, for producing a delayed third electrical signal responsive to either said second or said third electrical signal, indicating when said golf car beings traveling, said delayed control means being further adapted for indicating when said golf car is stationary by producing a delayed fourth electrical signal responsive to said first electrical signal;
memory means, located in said housing, for producing a fourth and fifth electrical signal responsive to said delayed first and said delayed second electrical signal respectively for memory of the last surface said golf car has traveled on;
clamp means, located in said housing, clamping said delayed first and said delayed second electrical signals to a level which does not allow said memory means to respond to a level change until said delayed control means produces said delayed third electrical signal;
timing means, located in said housing, for counting a first predetermined time period;
alarm means for sounding an alarm after said first predetermined time period is counted, said alarm means being further adapted for silencing of said alarm when said fifth electrical signal occurs;
resetting means, located in said housing, responsive to said memory means, for shutting off said alarm means and resetting said first predetermined time period to begin counting said first predetermined time period when actuated;
and switching means for manually bypassing said limiting system allowing use of said golf car without assistance of said limiting system.

15. The limiting system according to claim 13, further comprising an indicating means for visual indication of said golf car operational status, said indicating means being responsive to said switching means applying power to said limiting system and illuminating said indicating means and said indicating means being responsive to said switching means removing said power from said limiting system and extinguishing said indicating means.

16. A limiting system warning when a golf car is improperly driven comprising:
a housing;
impact sensing means, located in said housing, for producing an electrical signal greater in amplitude to an impact force from either of two angles one hundred and eighty degrees from each other and producing an electrical signal lesser in amplitude to an impact force from the remaining directions, the ratio of said greater in amplitude and said lesser in amplitude being adjustable;

amplifier filtering means, located in said housing, responsive to said electrical signal for producing selected frequency signals from said impact sensing means;

an electronic unit, located in said housing, responsive to said selected frequency signals producing a control signal when a preset threshold voltage level is exceeded;

alarm means for sounding an alarm after said control signal is produced;

deactivating means, for ending operating of said golf car after said control signal is produced;

switching means for manually resetting said deactivating means and silencing said alarm, allowing use of said golf car with assistance of said limiting system, said switching means also for manually bypassing said limiting system allowing use of said golf car without assistance of said limiting system.

17. The limiting system according to claim 15, wherein said switching means is a switch moveable between a first switch position and a second switch position, said first switch position applies power to said limiting system allowing impact sensing, said first switch position also applies said power to one terminal of a latching relay control circuit, which moves a latching relay contact to a first contact position, said second switch position removes said power from said limiting system by passing said impact sensing means, and deenergizes said latching relay control circuit which moves said latching relay contact to a second contact position.

18. The limiting system acording to claim 17, wherein said switching means includes reactivating means by switching monentarily said switching means to said second switch position which moves said latching relay contact to said second contact position then switching back to said first switch position.

19. The limiting system according to claim 16, wherein said switching means includes a digital touch pad responding to a numbered sequence to replace said switching means.

20. A limiting system warning when a golf car is improperly driven comprising:
a housing;
sensor probe means, located on said housing, mounted under said golf car for producing contact signals dependent upon the frequency and vertical impact of a contact point along the horizontal movement therealong;

first amplifier filter means, located in said housing, for producing selected electrical frequency signals in response to said contact signals for reducing improper signal pickup from said sensor probe;

signal detecting means, located in said housing, responsive to said selected electrical frequency signals producing a first electrical signal when said golf car is stationary, producing a second electrical signal when said golf car is traveling on the grass, and a third electrical signal when said golf car is traveling on the car path;

time constant means, located in said housing, for producing a delayed first electrical signal and a delayed second electrical signal, producing said delayed first electrical signal responsive to said first and said second electrical signal, producing said delayed second electrical signal responsive to said third electrical signal;

delayed control means, located in said housing, for producing a delayed third electrical signal responsive to either said second or said third electrical signal, indicating when said golf car begins traveling, said delayed control means being further adapted for indicating when said golf car is stationary by producing a delayed fourth electrical signal responsive to said first electrical signal;

memory means, located in said housing, for producing a fourth and fifth electrical signal responsive to said delayed first and said delayed second electrical signal respectively for memory of the last surface said golf car has traveled on;

clamp means, clamping said delayed first and said delayed second electrical signals to a level which does not allow said memory means to respond to a level change until said delayed control means produces said delayed third electrical signal;

alarm means for sounding an alarm when a fourth electrical signal occurs, said alarm means being further adapted for silencing of said alarm when said fifth electrical signal occurs.

* * * * *